US009009459B1

(12) United States Patent
Nachenberg et al.

(10) Patent No.: US 9,009,459 B1
(45) Date of Patent: Apr. 14, 2015

(54) SYSTEMS AND METHODS FOR NEUTRALIZING FILE-FORMAT-SPECIFIC EXPLOITS INCLUDED WITHIN FILES CONTAINED WITHIN ELECTRONIC COMMUNICATIONS

(75) Inventors: Carey Nachenberg, Manhattan Beach, CA (US); Fanglu Guo, Los Angeles, CA (US); Susanta Nanda, Los Angeles, CA (US); Sandeep Bhatkar, Sunnyvale, CA (US); Darren Shou, La Jolla, CA (US); Marc Dacier, Santa Monica, CA (US)

(73) Assignee: Symantec Corporation, Mountain View, CA (US)

( * ) Notice: Subject to any disclaimer, the term of this patent is extended or adjusted under 35 U.S.C. 154(b) by 368 days.

(21) Appl. No.: 13/418,332

(22) Filed: Mar. 12, 2012

(51) Int. Cl.
G06F 15/16 (2006.01)
G06F 21/56 (2013.01)

(52) U.S. Cl.
CPC ..................................... *G06F 21/56* (2013.01)

(58) Field of Classification Search
CPC .............................. G06F 15/00; G06F 15/173
USPC ........................................... 713/155/185/188
See application file for complete search history.

(56) References Cited

U.S. PATENT DOCUMENTS

| 7,490,244 | B1 | 2/2009 | Kennedy et al. | |
|---|---|---|---|---|
| 8,051,465 | B1* | 11/2011 | Martin et al. | 726/3 |
| 8,200,259 | B2* | 6/2012 | Kupsh et al. | 455/466 |
| 2001/0005889 | A1* | 6/2001 | Albrecht | 713/201 |
| 2003/0037302 | A1* | 2/2003 | Dzienis | 715/523 |
| 2005/0273858 | A1 | 12/2005 | Zadok et al. | |
| 2006/0259948 | A1 | 11/2006 | Calow et al. | |
| 2007/0100999 | A1* | 5/2007 | Haider | 709/225 |
| 2009/0150419 | A1* | 6/2009 | Kim et al. | 707/101 |
| 2009/0187992 | A1 | 7/2009 | Poston | |
| 2011/0125863 | A1 | 5/2011 | Massand | |
| 2012/0005756 | A1 | 1/2012 | Hoefelmeyer et al. | |
| 2012/0331517 | A1 | 12/2012 | Wilcox | |
| 2013/0160127 | A1 | 6/2013 | Jeong et al. | |
| 2013/0253976 | A1 | 9/2013 | Shukla et al. | |

OTHER PUBLICATIONS

"Getting Owned by Malicious PDF-Analysis"—SANS Institute, Oct. 2010 http://www.sans.org/reading-room/whitepapers/malicious/owned-malicious-pdf-analysis-33443.*
Jian-Yuan Ma et al.; Suppress Malicious Scripts in Multimedia by File Format Conversion; Institute of Computer and Communication; National Cheng Kung University; Accessed on Jan. 17, 2012.
John Muir; Trusted Strategies, No Time for Zero-Day Solutions; http://www.trustedstrategies.com/papers/white_paper_zero_day_threats.pdf; Accessed on Jan. 5, 2012.
About.com Antivirus Software; GFI Offers Trojan & Executable Analyzer; http://antivirus.about.com/library/weekly/aa062303a.html; Accessed on Jan. 5, 2012.
Roger Needham et al.; Network Attack and Defense; http://www.cl.cam.ac.uk/~rja14/Papers/SE-18.pdf; Accessed on Jan. 5, 2012.
The Contemplation; Roku Channels; http://www.thecontemplation.com/index.php/2010/09/10/new-threat-affecting-computersvia-email-attachment/; May 31, 2011.

(Continued)

*Primary Examiner* — Randy Scott
(74) *Attorney, Agent, or Firm* — ALG Intellectual Property, LLC

(57) ABSTRACT

A computer-implemented method for neutralizing file-format-specific exploits contained within electronic communications may include (1) identifying an electronic communication, (2) identifying at least one file contained within the electronic communication, and then (3) neutralizing any file-format-specific exploits contained within the file. In one example, neutralizing any file-format-specific exploits contained within the file may include applying at least one file-format-conversion operation to the file. Additionally or alternatively, neutralizing any file-format-specific exploits contained within the file may include constructing a sterile version of the file that selectively omits at least a portion of any exploitable content contained within the file. Various other methods, systems, and computer-readable media are also disclosed.

20 Claims, 8 Drawing Sheets

(56) References Cited

OTHER PUBLICATIONS

Smutz, Charles et al., "Malicious PDF Detection using Metadata and Structural Features", http://cs.gmu.edu/~astavrou/research/Malicious_PDF_Detection_ACSAC_12.pdf, as accessed Jun. 24, 2013, ACSAC '12; ACM; Orlando, Florida, (Dec. 3-7, 2012), 239-248.

Srndic, Nedim et al., "Detection of Malicious PDF Files Based on Hierarchical Document Structure", http://www.ra.cs.uni-tuebingen.de/mitarb/srndic/srndic-laskov-ndss-2013.pdf, as accessed Jun. 24, 2013, 20th Annual Network and Distributed System Security Symposium (NDSS); San Diego, California, (Feb. 24-27, 2013).

Chiron, "How to Tell if a File is Malicious", http://www.techsupportalert.com/content/how-tell-if-file-malicious.htm, as accessed Jun. 24, 2013, (Jul. 18, 2010).

Engelberth, Markus et al., "Detecting malicious documents with combined static and dynamic analysis", http://www.virusbtn.com/pdf/conference_slides/2009/Willems-VB2009.pdf, as accessed Jun. 24, 2013, Virus Bulletin 200; Pi1—Laboratory for Dependable Distributed Systems; Universitat Mannheim; Geneva, (2009).

Nguyen, Anh Quynh "Detecting malicious documentation", http://www.coseinc.com/en/index.php?rt=download&act=publication&file=D-Analyzer.pdf, as accessed Jun. 24, 2013, SyScan 2010; Ho Chi Minh City, (Sep. 23, 2010).

Digiprove, "A Novel Way of Detecting Malicious PDF Documents", http://secdiary.com/article/novel-detection-malicious-pdf-javascript/, as accessed Jun. 24, 2013, The Security Diaries, (Mar. 17, 2012).

Sandeep Bhatkar, et al; Systems and Methods for Detecting Malicious Documents Based on Component-Object Reuse; U.S. Appl. No. 14/073,815, filed Nov. 6, 2013.

Jollans, Tony "Uncompressing Documents—VBA Project Storage", http://www.wordarticles.com/Articles/Formats/VBAStorage.php, as accessed Sep. 3, 2013, (Aug. 30, 2012).

Jollans, Tony "Uncompressing Documents—Old Format Documents", http://www.wordarticles.com/Articles/Formats/StructuredStorage.php, as accessed Sep. 3, 2013, (Aug. 30, 2012).

Maxey, Gregory K., "VBA Basics", http://gregmaxey.mvps.org/word_tip_pages/vba_basics.html, as accessed Sep. 3, 2013, (Jun. 10, 2013).

Microsoft Corporation, "[MS-OFCGLOS]: Microsoft Office Master Glossary", http://download.microsoft.com/download/1/6/F/16F4E321-AA6B-4FA3-8AD3-E94C895A3C97/[MS-OFCGLOS].pdf, as accessed Nov. 18, 2013, (Nov. 18, 2013).

Microsoft Corporation, "Delete a macro", http://office.microsoft.com/en-us/word-help/delete-a-macro-HA010099770.aspx, as accessed Sep. 3, 2013, (Jul. 11, 2010).

Microsoft Corporation, "Create or delete a macro", http://office.microsoft.com/en-us/excel-help/create-or-delete-a-macro-HP010342374.aspx, as accessed Sep. 3, 2013, (Jul. 3, 2010).

"How to remove macros from binary MS Office documents?", http://stackoverflow.com/questions/7298765/how-to-remove-macros-from-binary-ms-office-documents, as accessed Sep. 3, 2013, Stack Overflow, (Sep. 4, 2011).

Microsoft Corporation, "Create, run, edit, or delete a macro", http://office.microsoft.com/en-us/mac-word-help/create-run-edit-or-delete-a-macro-HA102927318.aspx, as accessed Sep. 3, 2013.

Admin, "What Is a Macro Virus and How to Remove It", http://www.combofix.org/what-is-a-macro-virus-and-how-to-remove-it.php, as accessed Sep. 3, 2013, ComboFig.org, (2008).

Extendoffice.com, "How to remove macros from document in Word?", http://www.extendoffice.com/documents/word/758-word-remove-macros.html, as accessed Sep. 3, 2013, (2009).

Susanta Nanda, et al.; Systems and Methods for Protecting Document Files from Macro Threats; U.S. Appl. No. 14/073,507, filed Nov. 6, 2013.

Fanglu Guo, et al.; Systems and Methods for Healing Infected Document Files; U.S. Appl. No. 14/025,779, filed Sep. 12, 2013.

"Advanced Persistent Threats and Other Advanced Attacks: Threat Analysis and Defense Strategies for SMB, Mid-Size, and Enterprise Organizations", http://www.websense.com/assets/white-papers/whitepaper-websense-advanced-persistent-threats-and-other-advanced-attacks-en.pdf, as accessed Jun. 24, 2013, A Websense® White Paper, (2011).

"Mitigation Guidelines for Advanced Persistent Threats", https://web.archive.org/web/20120204003219/http://www.publicsafety.gc.ca/prg/em/ccirc/2011/tr11-002-eng.aspx, as accessed Jun. 24, 2013, No. TR11-002, Public Safety Canada, (Dec. 2, 2011).

Li, Frankie "A Detailed Analysis of an Advanced Persistent Threat Malware", http://www.sans.org/reading-room/whitepapers/malicious/detailed-analysis-advanced-persistent-threat-malware-33814, as accessed Jun. 24, 2013, SANS Institute InfoSec Reading Room, (Oct. 13, 2011).

Rede, Mike "A Guide to Converters and Viewers for Email Attachments", http://www.theemailadmin.com/2009/07/a-guide-to-converters-and-viewers-for-email-attachments/, as accessed Jun. 24, 2013, TheEmailADMIN, (Jul. 29, 2009).

"Saving and Viewing E-mail Attachments in Microsoft Outlook", http://www.dummies.com/how-to/content/saving-and-viewing-email-attachments-in-microsoft-outlook.html, as accessed Jun. 24, 2013, (Aug. 8, 2010).

"Attachments: View, download, and save", https://support.google.com/mail/answer/30719?hl=en, as accessed Jun. 24, 2013, Google, (Apr. 12, 2013).

"Solid Documents Releases Solid Converter® 7.3", http://www.soliddocuments.com/pdf/_solid_converter_v7_3/312/1, as accessed Jun. 24, 2013, Nelson, New Zealand, (Oct. 1, 2012).

"Frank Boldewin's www.reconstructer.org", http://www.reconstructer.org/code.html, as accessed Jun. 24, 2013, (Feb. 5, 2007).

"R-Tools Technology", http://www.r-tt.com/word_recovery/, as accessed Jun. 24, 2013, (2000).

"The Undelete Company", http://the-undelete.com/promo.php, as accessed Jun. 24, 2013, (Jul. 17, 2012).

"The Symantec Brightmail Gateway Appliance quarantines Microsoft Office 2007 documents under the Executable File rule", http://www.symantec.com/business/support/index?page=content&id=TECH86094, as accessed Jun. 24, 2013, Article:TECH86094, Symantec Corporation, (Jan. 26, 2007).

Sanjaykumarm, "Extracting embedded spreadsheets from wordprocessingML documents", http://openxmldeveloper.org/blog/b/openxmldeveloper/archive/2007/05/10/1543.aspx, as accessed Jun. 24, 2013, (May 10, 2007).

"Remove hidden data and personal information from Office documents", https://support.office.com/en-us/article/Remove-hidden-data-and-personal-information-from-Office-documents-c2499d69-413c-469b-ace3- cf7e31a85953?ui=en-US&rs=en-US&ad=US, as accessed Jun. 24, 2013, Microsoft, (On or before Jun. 24, 2013).

"Add or remove a digital signature in Office documents", https://support.office.com/en-us/article/Add-or-remove-a-digital-signature-in-Office-documents-49af4304-bfe7-41bf-99c3-a5023bdab44a?ui=en-US&rs=enUS&ad=US, as accessed Jun. 24, 2013, Microsoft, (On or before Jun. 24, 2013).

"Create, change, or delete an OLE object", https://support.office.com/en-us/article/Create-change-or-delete-an-OLE-object-f767f0f1-4170-4850-9b96-0b6c07ec6ea4?ui=en-US&rs=en-US&ad=US, as accessed Jun. 24, 2013, Microsoft, (On or before Jun. 24, 2013).

"Remove background colors, images, or text from a document", http://office.microsoft.com/en-gb/word-help/remove-background-colors-images-or-text-from-a-document-HP005189623.aspx, as accessed Jun. 24, 2013, Microsoft, (Sep. 24, 2011).

"Deployment of the Microsoft Windows Malicious Software Removal Tool in an enterprise environment", http://support.microsoft.com/kb/891716, as accessed Jun. 24, 2013, Article ID: 891716, Microsoft, (Jan. 13, 2005).

Zeltser, Lenny "Analyzing Malicious Documents Cheat Sheet", http://zeltser.com/reverse-malware/analyzing-malicious-documents.html, as accessed Jun. 24, 2013, (1995).

"Safety 101: PC Safety", http://support.kaspersky.com/viruses/disinfection/5350?el=88446, as accessed Jun. 24, 2013, Kaspersky Lab, (1997).

\* cited by examiner

SYSTEMS AND METHODS FOR NEUTRALIZING FILE-FORMAT-SPECIFIC EXPLOITS INCLUDED WITHIN FILES CONTAINED WITHIN ELECTRONIC COMMUNICATIONS

BACKGROUND

In recent years, malicious programmers have created a variety of sophisticated attacks aimed at high-profile or high-level entities, such as governments, corporations, political organizations, defense contractors, or the like. In many cases, the goal of such an attack is to gain access to highly sensitive or confidential information, such as financial information, defense-related information, and/or intellectual property (e.g., source code), and/or to simply disrupt an entity's operations.

Many such attacks involve sending emails to a targeted entity that contain an attachment that has been carefully crafted to take advantage of an as-yet-undiscovered vulnerability of a particular application (commonly known as a "zero-day" exploit). Because many security software companies attempt to combat malware by creating and deploying malware signatures (e.g., hash functions) that uniquely identify known malware, this type of targeted attack (commonly known as a "spear phishing" attack) is often difficult for traditional security software to detect and/or neutralize since the exploits in question have yet to be publicly discovered.

In addition, while traditional security software may allow entities to block access to email attachments of a particularly dangerous file type (such as executable files), many entities are reluctant to block access to a variety of commonly used, but nonetheless exploitable, file types (such as MICROSOFT OFFICE files, ADOBE ACROBAT files, media files, video files, etc.) since these file types are frequently used as a means for exchanging information electronically. Unfortunately, malicious programmers may take advantage of this fact by deploying spear-phishing attacks that include attachments that exploit vulnerabilities within such commonly used file types.

As such, the instant disclosure identifies a need for improved systems and methods for identifying and neutralizing exploits contained within email attachments that are crafted to take advantage of specific vulnerabilities within the applications designed to handle such attachments.

SUMMARY

As will be described in greater detail below, the instant disclosure generally relates to systems and methods for neutralizing or defusing exploits contained within files included within electronic communications that are crafted to take advantage of, or that are sensitive to, specific characteristics, features, or vulnerabilities of a particular file format. In one example, a computer-implemented method for performing such a task may include (1) identifying an electronic communication, (2) identifying at least one file contained within the electronic communication, and then (3) neutralizing any file-format-specific exploits contained within the file by applying at least one file-format-conversion operation to the file. In this example, applying the file-format-conversion operation to the file may include identifying the file's current file format and then converting the file into at least one file format that is different from the file's current file format. Examples of the electronic communication in question include, without limitation, emails, instant messages, text messages (e.g., MMS messages), or the like.

In one embodiment, identifying the file's current file format may include determining that the file represents a container file that contains at least one additional file in at least one file format. In this embodiment, converting the file into at least one file format that is different from the file's current file format may include extracting at least one file from the container file and then, for each file extracted from the container file, neutralizing any file-format-specific exploits contained within the extracted file by applying at least one file-format-conversion operation to the extracted file. In this embodiment, applying the file-format-conversion operation to the extracted file may include identifying the extracted file's current file format and converting the extracted file into at least one file format that is different from the extracted file's current file format. In some examples, the method may also include combining each converted extracted file into a new container file.

If the identified file represents a container file, then the method may also include performing one or more additional security operations on the container file, such as removing any unrecognized file types from the container file and/or removing any active content from the container file. In addition, the file format of a container file may be directly converted by (1) identifying the container file's current container file format and then (2) converting the container file into at least one container file format that is different from the container file's current container file format.

In some examples, the file-format-conversion operation may leave the file in a file format that is different from the file's original file format. In other examples, the file-format-conversion operation may, after converting the file into a file format that is different from the file's original file format, convert the file back into its original file format.

Applying the file-format-conversion operation to the file may involve applying either a single file-format-conversion operation or a plurality of file-format-conversion operations to the file. In addition, in some examples the file-format-conversion operation may be applied to the file within a secure environment.

As will be explained in greater detail below, in some examples the method may also include constructing a safe or "sterile" version of the file based on the file's contents by (1) identifying content contained within the file that is vulnerable to at least one exploit and then (2) selectively omitting at least a portion of this exploitable content from the sterile version of the file.

The above-recited method may be performed by a variety of types of devices, including an endpoint computing device and/or a server-side computing device, such as an email server, gateway, and/or cloud service. In one embodiment, a system for implementing the above-described method may include an identification module programmed to (1) identify an electronic communication and (2) identify at least one file contained within the electronic communication. The system may also include a conversion module programmed to neutralize any file-format-specific exploits contained within the file by applying at least one file-format-conversion operation to the file. In one embodiment, the conversion module may apply the file-format-conversion operation to the file by identifying the file's current file format and then converting the file into at least one file format that is different from the file's current file format. The system may also include at least one processor configured to execute the identification module and the conversion module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify an electronic communication, (2) identify at least one file contained within the electronic communication, and then (3) neutralize any file-format-specific exploits contained within the file by applying at least one file-format-conversion operation to the file. In one example, this file-format-conversion operation may include identifying the file's current file format and then converting the file into at least one file format that is different from the file's current file format.

In an additional example, a computer-implemented method for neutralizing file-format-specific exploits included within files contained within electronic communications may include (1) identifying an electronic communication, (2) identifying at least one file contained within the electronic communication, and then (3) neutralizing any file-format-specific exploits contained within the file by constructing a safe or "sterile" version of the file based on the file's contents. In one example, constructing this sterile version of the file may include (1) identifying content contained within the file that is vulnerable to at least one exploit and then (2) selectively omitting at least a portion of this exploitable content from the sterile version of the file. In some examples, the sterile version of the file may be constructed in a file format that is identical to the file format of the original file.

In one embodiment, selectively omitting at least a portion of the exploitable content from the sterile version of the file may include (1) retrieving a whitelist that identifies trustworthy content types, (2) determining that at least one item of content contained within the file is of a content type that is not identified on the whitelist, and then (3) omitting the item of content from the sterile version of the file. Additionally or alternatively, selectively omitting at least a portion of the exploitable content from the sterile version of the file may include (1) retrieving a blacklist that identifies exploitable content types, (2) determining that at least one item of content contained within the file is of a content type that is identified on the blacklist, and then (3) omitting the item of content from the sterile version of the file.

In some examples, the sterile version of the file may be constructed within a secure environment. Moreover, in some embodiments the step of neutralizing file-format-specific exploits contained within the file may also include applying at least one file-format-conversion operation to the file itself, at least one file extracted from the file, and/or the sterile file.

The above-recited method may be performed by a variety of types of devices, including an endpoint computing device and/or a server-side computing device, such as an email server, gateway, and/or cloud service. In one embodiment, a system for implementing the above-described method may include an identification module programmed to (1) identify an electronic communication and (2) identify at least one file contained within the electronic communication. The system may also include a sterilization module programmed to neutralize any file-format-specific exploits contained within the file by constructing a sterile version of the file that omits at least a portion of any exploitable content contained within the file. The system may also include at least one processor configured to execute the identification module and the sterilization module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify an electronic communication, (2) identify at least one file contained within the electronic communication, and then (3) neutralize any file-format-specific exploits contained within the file by constructing a sterile version of the file that omits at least a portion of any exploitable content contained within the file.

As will be explained in greater detail below, by performing one or more file-format-conversion operations on files contained within electronic communications, the systems and methods described herein may effectively neutralize or defuse any exploits contained within such files that are crafted to take advantage of, or that are sensitive to, specific characteristics, features, or vulnerabilities of a particular file format, even if these exploits represent as-yet-undiscovered (i.e., zero-day) exploits. Additionally or alternatively, by selectively dropping or omitting exploitable content from such files, the systems and methods described herein may effectively construct or create safe or "sterile" versions of these files. Moreover, because the various operations disclosed herein may neutralize file-format-specific exploits without overly negatively impacting the legitimate content contained within these files, the systems and methods described herein may provide protection against such exploits without overly negatively impacting an end user's experience. As such, the systems and methods described herein may successfully protect end users from file-format-specific exploits contained within file attachments without having to completely block access to the file formats that are susceptible to such exploits.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
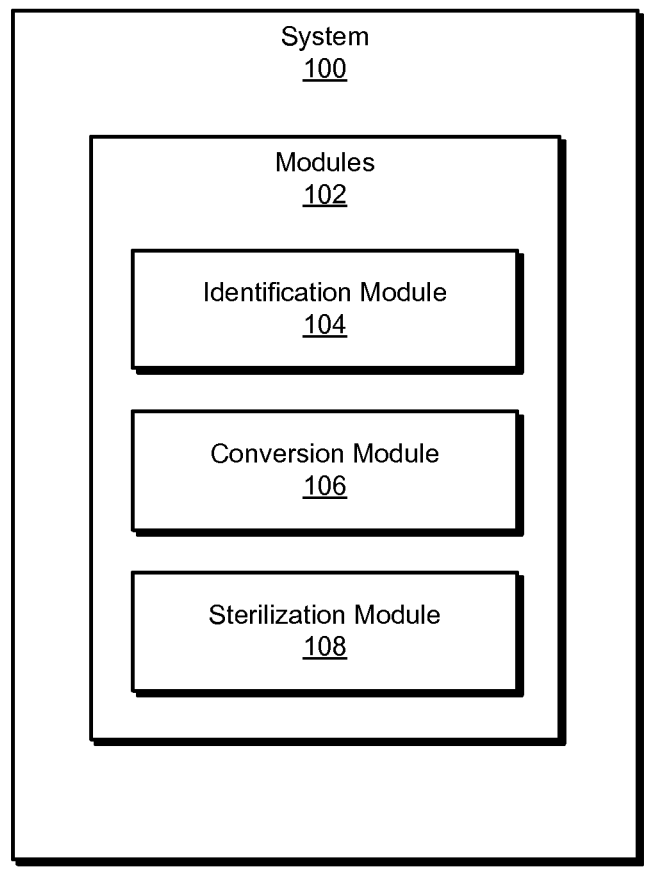
FIG. 1 is a block diagram of an exemplary system for neutralizing file-format-specific exploits included within files contained within electronic communications.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
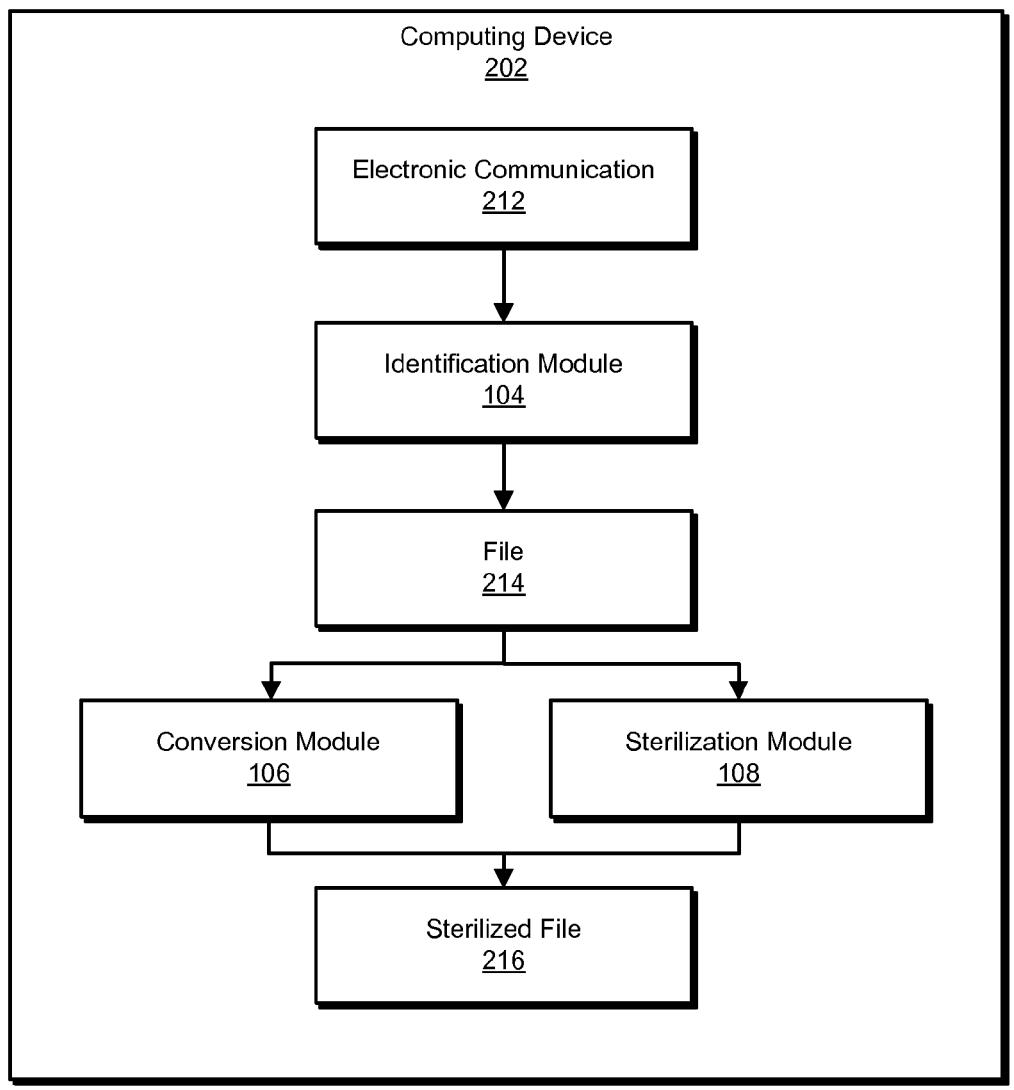
FIG. 2 is a block diagram of an exemplary system for neutralizing file-format-specific exploits included within files contained within electronic communications.

The following will provide, with reference to FIGS. 1-2, detailed descriptions of exemplary systems for neutralizing file-format-specific exploits included within files contained within electronic communications. Detailed descriptions of corresponding computer-implemented methods will also be provided in connection with FIGS. 3-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for neutralizing file-format-specific exploits included within files contained within electronic communications. As illustrated in this figure, exemplary system 100 may include one or more modules 102 for performing one or more tasks. For example, and as will be explained in greater detail below, exemplary system 100 may include an identification module 104 programmed to (1) identify an electronic communication and (2) identify at least one file contained within the electronic communication. Exemplary system 100 may also include a conversion module 106 programmed to neutralize any file-format-specific exploits contained within the file by applying at least one file-format-conversion operation to the file. In addition, exemplary system 100 may include a sterilization module 108 programmed to construct a sterile version of a file that omits at least a portion of any exploitable content contained within the file. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 in FIG. 2, computing system 710 in FIG. 7, and/or portions of exemplary network architecture 800 in FIG. 8. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of computing device 202 in FIG. 2. In one embodiment, one or more of modules 102 from FIG. 1 may, when executed by at least one processor of computing device 202, enable computing device 202 to neutralize file-format-specific exploits included within files contained within electronic communications. For example, and as will be described in greater detail below, one or more of modules 102 may cause computing device 202 to (1) identify an electronic communication (e.g., electronic communication 212), (2) identify at least one file (e.g., file 214) contained within the electronic communication, and then (3) neutralize any file-format-specific exploits contained within the file. In one example, modules 102 may cause computing device 202 to neutralize any file-format-specific exploits contained within the file by applying at least one file-format-conversion operation to the file that converts the file into at least one file format that is different from the file's current file format. Additionally or alternatively, modules 102 may cause computing device 202 to neutralize any file-format-specific exploits contained within the file by constructing a sterile version of the file (e.g., sterilized file 216) that omits any exploitable content contained within the file.

Computing device 202 generally represents any type or form of computing device capable of reading computer-executable instructions. Examples of computing device 202 include, without limitation, endpoint computing devices (such as laptops, tablets, desktops, servers, cellular phones, personal digital assistants (PDAs), multimedia players, embedded systems, combinations of one or more of the same, and/or exemplary computing system 710 in FIG. 7), server-side computing devices (such as email servers, gateways, and/or cloud services) configured to provide various services and/or run certain software applications, and/or any other suitable computing device.

Figure 3:
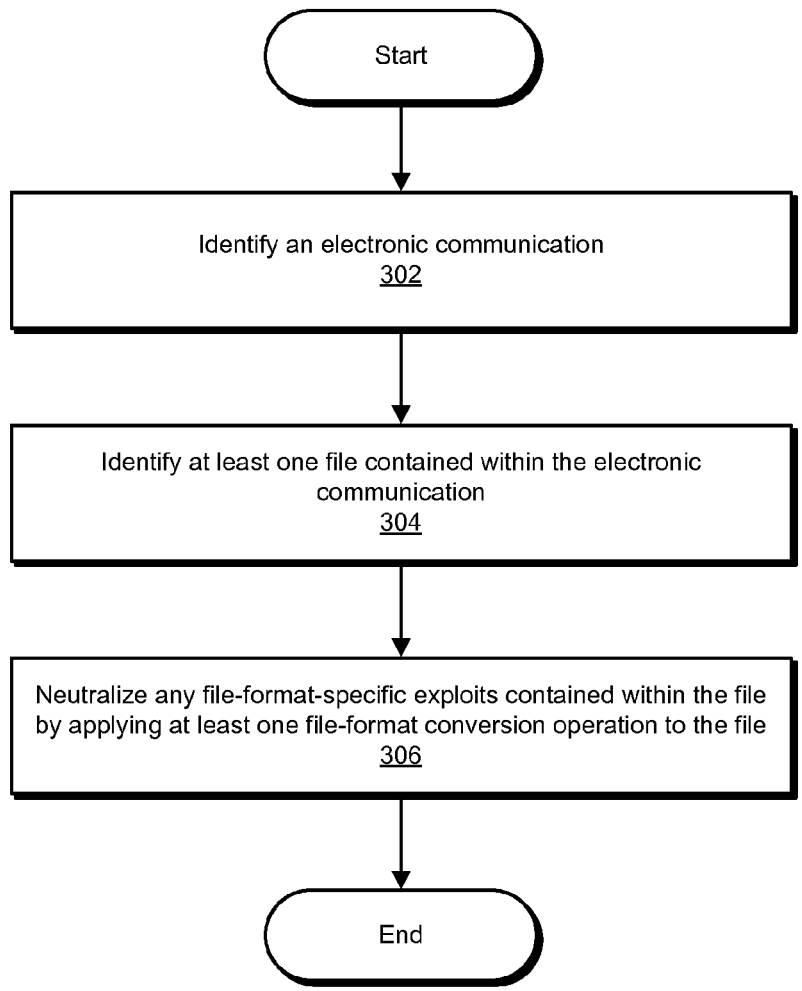
FIG. 3 is a flow diagram of an exemplary method for neutralizing file-format-specific exploits included within files contained within electronic communications.

FIG. 3 is a flow diagram of an exemplary computer-implemented method 300 for neutralizing file-format-specific exploits included within files contained within electronic communications. The steps shown in FIG. 3 may be performed by any suitable computer-executable code and/or computing system. In some embodiments, the steps shown in FIG. 3 may be performed by one or more of the components of system 100 in FIG. 1, computing device 202 in FIG. 2, computing system 710 in FIG. 7, and/or portions of exemplary network architecture 800 in FIG. 8.

As illustrated in FIG. 3, at step 302 the systems described herein may identify an electronic communication. For example, identification module 104 may, as part of computing device 202 in FIG. 2, identify an electronic communication 212.

The phrase "electronic communication," as used herein, generally refers to any type or form of mechanism for exchanging digital messages. Examples of electronic communications include, without limitation, emails, instant messages, text messages (e.g., MMS messages), and/or any other form of digital message. As will be explained in greater detail below, in some examples an electronic communication may be capable of including (either as an attachment or as an embedded object) one or more files.

The systems described herein may perform step 302 in a variety of ways. In one example, identification module 104 may identify an inbound electronic communication by receiving or intercepting the same. For example, identification module 104 may, as part of computing device 202 in FIG. 2 (which may, as detailed above, represent an endpoint computing device and/or a server-side computing device, such as an email server, gateway, and/or cloud service), identify electronic communication 212 in FIG. 2 by receiving and/or intercepting the same.

At step 304, the systems described herein may identify at least one file contained within the electronic communication identified in step 302. For example, identification module 104 may, as part of computing device 202 in FIG. 2, identify at least one file 214 contained within electronic communication 212.

The term "file," as used herein, generally refers to any type or form of data entity maintained in computer-readable form. Files may be stored in a variety of file formats, which may refer to the particular way in which information is encoded or stored within a file. In some examples, file formats may be designed to store particular types of data. Examples of such file formats (sometimes referred to as "basic file formats") include, without limitation, file formats designed to store text (e.g., .txt files, .pdf files, etc.), images (e.g., .gif files, .bmp files, etc.), audio (e.g., .mp3 files, .wma files, .aac files, etc.), and/or video (e.g., .mp4 files, .avi files, etc.). In other examples, file formats may specify how differing data elements may coexist within a single file and/or may combine a number of discrete files together into a single file. Examples of such file formats (sometimes referred to as "container file formats") include, without limitation, archive formats (e.g., .zip files, .rar files, etc.) and/or file formats designed to store multiple types of data (e.g., .docx files, .pptx files, .xlsx files, etc.).

The systems described herein may perform step 304 in a variety of ways. In one example, identification module 104 may identify a document (e.g., a .pdf file) attached to an email. In another example, identification module 104 may identify an image (e.g., a .bmp file) embedded within the body of an HTML-based email. In an additional example, identification module 104 may identify a container file (e.g., a .docx file, a .zip file, etc.) that contains one or more additional files attached to an email.

At step 306, the systems described herein may neutralize any file-format-specific exploits contained within the file identified in step 304 by applying at least one file-format-conversion operation to the file. For example, conversion module 106 may, as part of computing device 202 in FIG. 2, apply one or more file-format-conversion operations to file 214, resulting in sterilized file 216.

The phrase "file-format-specific exploit," as used herein, generally refers to any type or form of malicious computer-readable instruction crafted to take advantage of, or that is sensitive to, specific characteristics, features, or vulnerabilities of a particular file format. Examples of file-format-specific exploits include, without limitation, computer-readable instructions crafted to exploit file-format buffer overflows, heap overflows, integer overflows, format-string vulnerabilities, and/or any other type or form of file-format vulnerability.

As detailed above, in one example the systems described herein may neutralize any file-format-specific exploits contained within the file identified in step 304 by applying at least one file-format-conversion operation to the file. The phrase "file-format-conversion operation," as used herein, generally refers to any type or form of operation that results in transforming or converting a file from one file format into at least one different file format. In some examples, this file-format-conversion operation may result in the creation of an entirely new file (created, for example, by reconstructing the elements of the original file into a new file format). As will be explained in greater detail below, because file-format-specific exploits are typically carefully crafted to take advantage of, and are thus especially sensitive to, specific characteristics, features, or vulnerabilities of a particular file format, the systems described herein may effectively neutralize such exploits by transforming or converting a file into at least one different file format. Because the characteristics and features of the file's new file format are likely to differ from the file's original file format, such an operation is highly likely to render the exploit in question useless or ineffective.

In one example, file-format-conversion operations may be file-format specific. For example, a file-format-conversion operation may convert a file from one file format designed for a particular type of data (e.g., an audio file format, such as an .mp3 file) into another file format designed for the same type of data (e.g., another audio file format, such as an .aac file). In another example, a file-format-conversion operation may convert a file from a file format designed for a particular type of data (e.g., a text file format, such as a .txt file) into a file format designed for a different, but translatable, type of data (e.g., an audio file format, such as an .mp3 file). In this example, the file-format-conversion operation may translate the data contained within the first file format into the second file format using various translation operations (e.g., speech-to-text and/or text-to-speech translation operations).

The systems described herein may perform step 306 in a variety of ways. In one example, conversion module 106 may perform step 306 by identifying the file's current file format and then converting the file into at least one file format that is different from the file's current file format. For example, as illustrated in FIG. 4A, conversion module 106 may convert file 214 from its original file format 402 (e.g., a .pdf file) into a different file format 404 (e.g., a .ps file).

In one example, conversion module 106 may apply a single file-format-conversion operation to the file identified in step 304. In another example, the systems described herein may perform a plurality of file-format-conversion operations to the file identified in step 304. For example, because the likelihood of neutralizing any file-format-specific exploits contained within a file may increase as the number of file-format-conversion operations performed on such a file increases, conversion module 106 may, as illustrated in FIG. 4B, convert file 214 from its original file format 402 into multiple different file formats 404(1)-(N) (e.g., from a .jpeg file to a .gif file to a .bmp file, etc.).

Figure 4A:
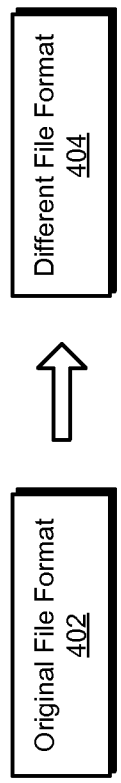
FIG. 4A is a block diagram of an exemplary file-format-conversion operation.
Figure 4B:
FIG. 4B is a block diagram of an additional exemplary file-format-conversion operation.
Figure 5A:
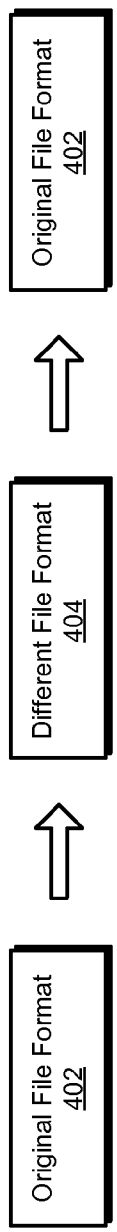
FIG. 5A is a block diagram of an additional exemplary file-format-conversion operation.

In some examples (and as illustrated in FIGS. 4A and 4B), the file-format-conversion operation performed in step 306 may leave the file identified in step 304 in a file format that is different from the file's original file format. In other examples, the file-format-conversion operation performed in step 306 may, after converting the file recited in step 304 into at least one file format that is different from the file's original file format, convert the file back into its original file format. For example, as illustrated in FIG. 5A, conversion module 106 may, after converting file 214 from its original file format 402 (e.g., an .mp4 file) into a different file format 404 (e.g., an .avi file), convert file 214 back into its original file format 402 (e.g., an .mp4 file).

Figure 5B:
FIG. 5B is a block diagram of an additional exemplary file-format-conversion operation.

In some examples, conversion module 106 may convert a file into multiple different file formats prior to converting the file back into its original file format. For example, as illustrated in FIG. 5B, conversion module 106 may convert file 214 from its original file format 402 (e.g., a .jpeg file) into multiple different file formats 404(1)-(n) (e.g., a .gif file, a .bmp file, etc.). Upon converting file 214 into these different file formats, conversion module 106 may convert file 214 back into its original file format 402 (e.g., a .jpeg file).

As detailed above, in some embodiments the file identified in step 304 may represent a container file that contains at least one additional file in at least one file format. In this example, the systems described herein may perform step 306 by extracting at least one file from the container file and then, for each file extracted from the container file, neutralizing any file-format-specific exploits contained within the extracted file by applying at least one file-format-conversion operation to the extracted file. For example, if file 214 in FIG. 2 represents a container file, then conversion module 106 may extract each file contained within file 214 and then apply one or more file-format-conversion operations to each of these extracted files. In some examples, conversion module 106 may then combine each of these converted, extracted files into a new container file that is identical to or different from the container file's original file format.

Additionally or alternatively, the systems described herein may directly convert the file format of a container file into a different file format. Specifically, if the file identified in step 304 represents a container file, then the systems described herein may perform step 306 by (1) identifying the container file's current file format and then (2) converting the container file into at least one container file format that is different from the container file's current container file format. For example, conversion module 106 may convert file 214 in FIG. 2 from its current container file format (e.g., a .docx file) into at least one different container file format (e.g., an .odt file).

In some examples, if the file identified in step 304 represents a container file, then the systems described herein may perform one or more additional security operations on this container file. For example, since malware developers may attempt to conceal malware within new or unrecognizable file types, conversion module 106 may remove or delete any unrecognized file types from a container file. Similarly, since malicious developers may include active content within a container file that contains malicious code, conversion module 106 may remove or delete any active content (e.g., executable content, scripts, macros, etc.) from a container file.

Since the file-format-conversion operation performed in step 306 may itself be vulnerable to various exploits, in some examples the systems described herein may perform this file-format-conversion operation within a secure environment. For example, conversion module 106 may apply one or more file-format-conversion operations to file 214 within a well-protected sandbox environment that is based on or includes various hardware virtualization techniques and/or access tokens.

Figure 6:
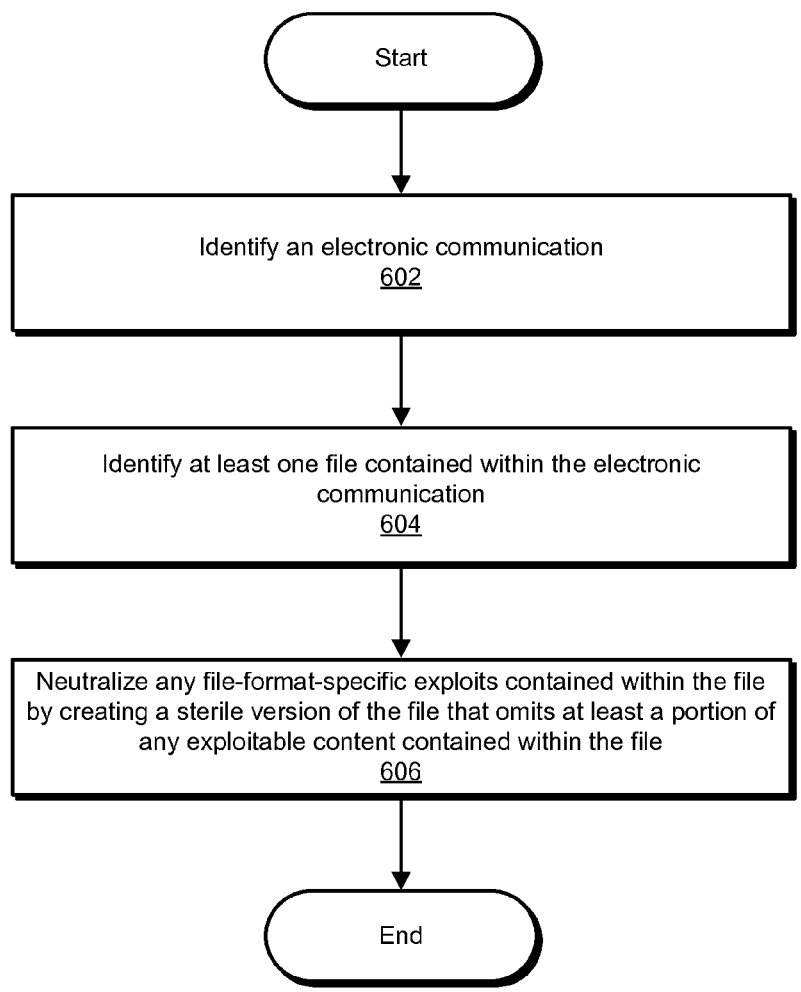
FIG. 6 is a flow diagram of an additional exemplary method for neutralizing file-format-specific exploits included within files contained within electronic communications.

FIG. 6 is a flow diagram of an additional exemplary computer-implemented method 600 for neutralizing file-format-specific exploits included within files contained within electronic communications. The steps shown in FIG. 6 may be performed by any suitable computer-executable code and/or computing system. In some embodiments, the steps shown in FIG. 6 may be performed by one or more of the components of system 100 in FIG. 1, computing device 202 in FIG. 2, computing system 710 in FIG. 7, and/or portions of exemplary network architecture 800 in FIG. 8.

As illustrated in FIG. 6, at step 602 the systems described herein may identify an electronic communication. For example, identification module 104 may, as part of computing device 202 in FIG. 2, identify electronic communication 212. At step 604, the systems described herein may identify at least one file contained within the electronic communication identified in step 602. For example, identification module 104 may, as part of computing device 202 in FIG. 2, identify at least one file 214 contained within electronic communication 212.

At step 606, the systems described herein may neutralize any file-format-specific exploits contained within the file identified in step 604 by constructing a safe or sterile version of the file based on the file's contents. For example, sterilization module 108 may, as part of computing device 202 in FIG. 2, construct sterilized file 216 based on the contents of file 214.

The systems described herein may perform step 606 in a variety of ways. In one example, the systems described herein may create a sterile version of the file identified in step 604 by (1) identifying exploitable content contained within the file and then (2) creating a new version of the file that selectively omits at least a portion of the exploitable content originally contained within the file.

The phrase "exploitable content," as used herein, generally refers to file content that is susceptible or vulnerable to exploits, such as exploits based on buffer overflows, heap overflows, integer overflows, format-string vulnerabilities, and/or any other type or form of vulnerability. Exploitable content may be both active and non-active. Examples of active exploitable content include, without limitation, scripts, macros, and any other non-binary active file content. In contrast, examples of non-active exploitable content include, without limitation, ADOBE FLASH content, PDF content, "rich" file content, and any other form of non-active file content that may be vulnerable to exploits.

The systems described herein may identify and selectively omit exploitable content in a variety of ways. In one example, the systems described herein may perform such a task by (1) retrieving a whitelist that identifies trustworthy content types, (2) determining that at least one item of content contained within the file identified in step 604 is of a content type that is not identified on the whitelist, and then (3) omitting the item of content from the sterile version of the file.

For example, sterilization module 108 may retrieve a whitelist that identifies trustworthy content types from a local storage device, a remote storage device, and/or an external device. In one example, this whitelist may identify content types (such as plain text) that are not susceptible or vulnerable to exploits. Additionally or alternatively, this whitelist may identify content types that have been deemed "safe" by a trusted entity, such as a security software provider.

Upon retrieving the whitelist, sterilization module 108 may determine, by comparing the contents of file 214 with the whitelist, that at least one item of content contained within file 214 is of a content type that is not identified on the whitelist. For example, sterilization module 108 may determine that (1) file 214 contains ADOBE FLASH content and (2) the whitelist does not identify ADOBE FLASH content as a trustworthy content type.

Upon determining that at least one item of content contained within file 214 is of a content type that is not identified on the whitelist, sterilization module 108 may create a sterile version of file 214 (e.g., sterilized file 216) that omits any such content, resulting in a new version of file 214 that is no longer susceptible (or is at least less susceptible) to exploits.

In another example, the systems described herein may identify and selectively omit exploitable content by (1) retrieving a blacklist that identifies exploitable content types, (2) determining that at least one item of content contained within the file identified in step 604 is of a content type that is identified on the blacklist, and then (3) omitting the item of content from the sterile version of the file.

For example, sterilization module 108 may retrieve a blacklist that identifies exploitable content types from a local storage device, a remote storage device, and/or an external device. In one example, this blacklist may identify content types (such as, e.g., ADOBE FLASH content, PDF content, or other "rich" file content) that are susceptible or vulnerable to exploits. Additionally or alternatively, this blacklist may identify content types that have been deemed unsafe by a trusted entity, such as a security software provider.

Upon retrieving the blacklist, sterilization module 108 may determine, by comparing the contents of file 214 with the blacklist, that at least one item of content contained within file 214 is of a content type that is identified on the blacklist. For example, sterilization module 108 may determine that (1) file 214 contains ADOBE FLASH content and (2) the blacklist identifies ADOBE FLASH content as an unsafe content type.

Upon determining that at least one item of content contained within file 214 is of a content type that is identified on the blacklist, sterilization module 108 may create a sterile version of file 214 (e.g., sterilized file 216) that omits any such content, resulting in a new version of file 214 that is no longer susceptible (or is at least less susceptible) to exploits.

In some examples, the file format of the resulting sterile version of the file may be identical to the file format of the original file. For example, if file 214 represents a PDF file, then sterilization module 108 may create sterilized file 216 in the PDF file format.

In some examples, the systems described herein may perform one or more additional security operations on the file identified in step 604. For example, since malware developers may attempt to conceal malware within new or unrecognizable file types, sterilization module 108 may remove or delete any unrecognized file types from file 214 when creating sterilized file 216.

In addition, since the sterilization process performed in step 606 may itself be vulnerable to various exploits, in some examples the systems described herein may construct the sterile version of the file within a secure environment. For example, sterilization module 108 may construct sterilized file 216 within a well-protected sandbox environment that is based on or includes various hardware virtualization techniques and/or access tokens.

Although described separately herein, in some examples one or more aspects and/or steps of the above-described methods may be combined. For example, in one embodiment the systems described herein may, in addition to applying at least one file-format-conversion operation to the file in step 306 in exemplary method 300, create a sterile version of the file that omits at least a portion of any executable content contained within the file. Similarly, the systems described herein may, in addition to creating a sterile version of the file in step 606 in exemplary method 600, apply at least one file-format-conversion operation to (1) the file itself, (2) at least one file extracted from the file (if, e.g., the file is a container file), and/or (3) the sterile file.

The above-described methods may be implemented in a variety of ways using any of a variety of devices. In one example, modules 102 may represent a portion of a software application (such as a security software application) installed on an endpoint device. In other examples, modules 102 may represent portions of a software application installed on one or more server-side devices, such as an email server, gateway, and/or cloud service.

In some examples, the systems described herein may perform the above-described methods prior to allowing the electronic communication identified in steps 302/602 (and, thus, the file identified in steps 304/604) to be accessed by an end user. For example, if computing device 202 represents an end user's device, then modules 102 may perform exemplary methods 300 and/or 600 prior to allowing the end user to access electronic communication 212 (and, thus, file 214). Similarly, if computing device 202 represents a server-side computing device (such as, for example, an email server, gateway, and/or cloud service), then modules 102 may perform exemplary methods 300 and/or 600 prior to allowing electronic communication 212 (and, thus, file 214) to reach its intended recipient.

As detailed above, by performing one or more file-format-conversion operations on files contained within electronic communications, the systems and methods described herein may effectively neutralize or defuse any exploits contained within such files that are crafted to take advantage of, or that are sensitive to, specific characteristics, features, or vulnerabilities of a particular file format, even if these exploits represent as-yet-undiscovered (i.e., zero-day) exploits. Additionally or alternatively, by selectively dropping or omitting exploitable content from such files, the systems and methods described herein may effectively construct or create safe or "sterile" versions of these files. Moreover, because the various operations disclosed herein may neutralize file-format-specific exploits without overly negatively impacting the legitimate content contained within these files, the systems and methods described herein may provide protection against such exploits without overly negatively impacting an end user's experience. As such, the systems and methods described herein may successfully protect end users from file-format-specific exploits contained within file attachments without having to completely block access to the file formats that are susceptible to such exploits.

Figure 7:
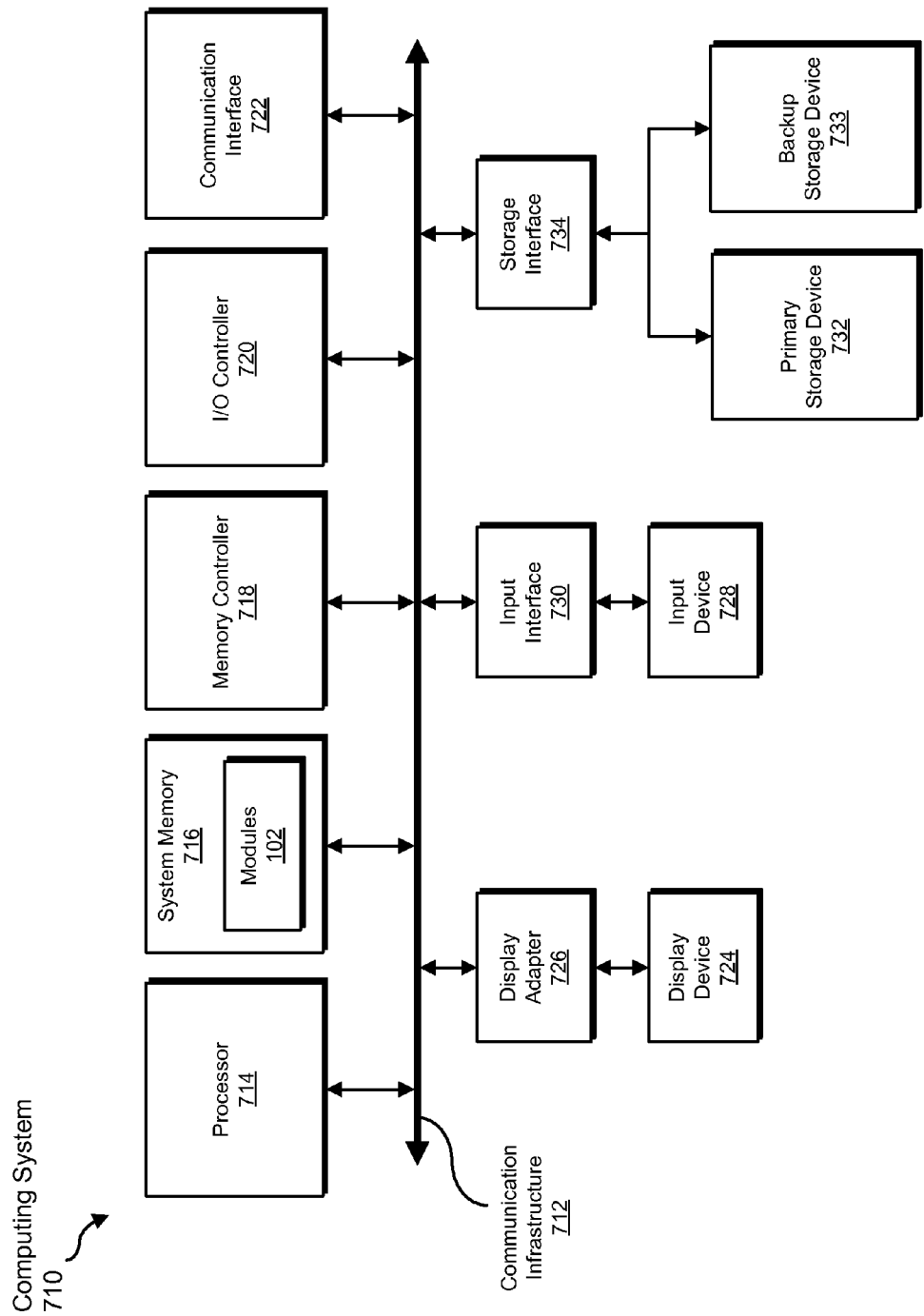
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the identifying, neutralizing, applying, converting, determining, extracting, combining, removing, constructing, omitting, and retrieving steps described herein. All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 710. All or a portion of the computer program stored on the computer-readable-storage medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
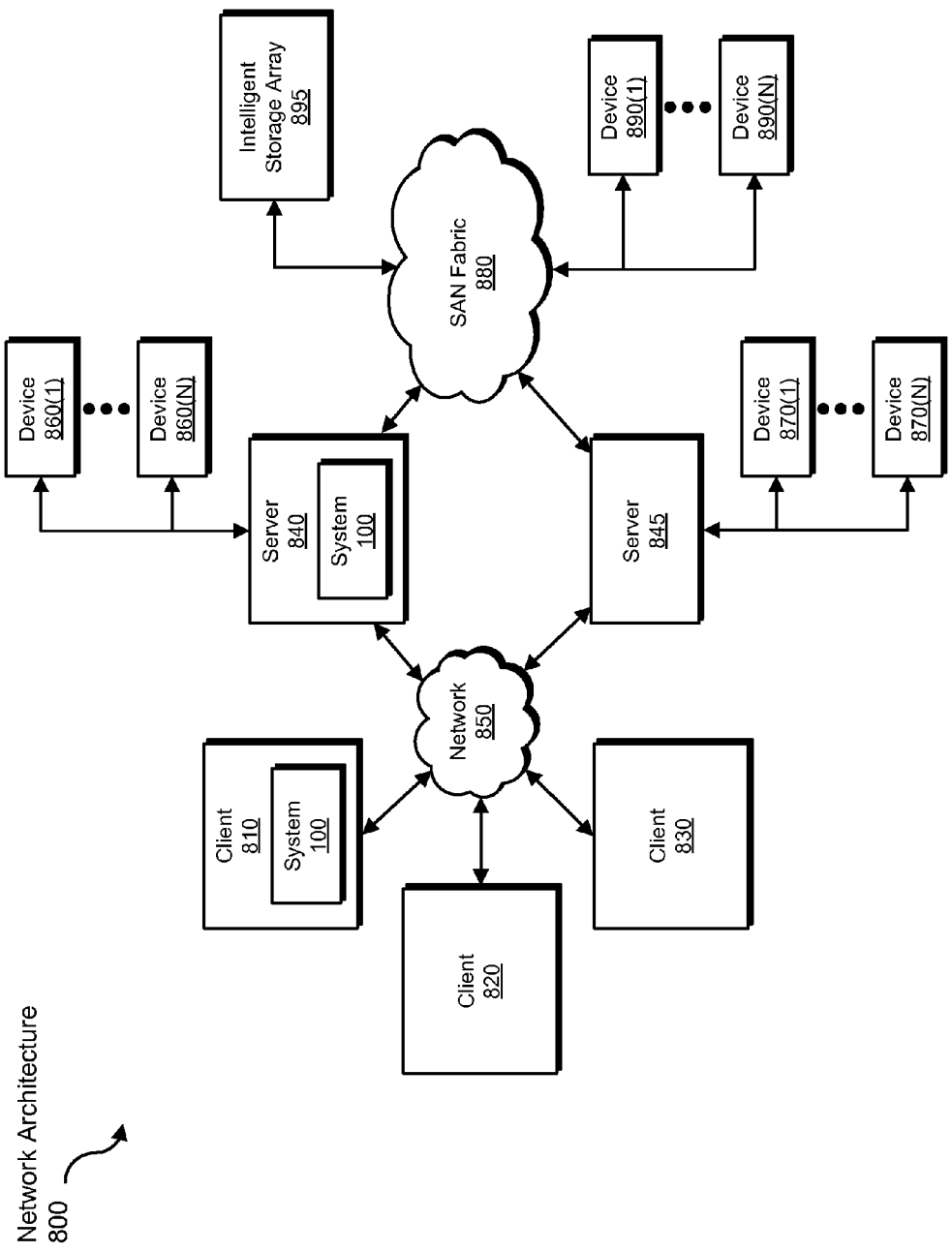
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the identifying, neutralizing, applying, converting, determining, extracting, combining, removing, constructing, omitting, and retrieving steps disclosed herein. All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890 (1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for neutralizing file-format-specific exploits included within files contained within electronic communications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device that is capable of neutralizing file-format-specific exploits contained within files included within electronic communications.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for neutralizing file-format-specific exploits included within files contained within electronic communications, at least a portion of the method being performed by a computing device comprising at least one processor, the method comprising:
    identifying an electronic communication transmitted to a specified recipient at least in part by intercepting the electronic communication during transmission;
    identifying at least one file attached to the electronic communication as an attachment;
    protecting the specified recipient of the electronic communication by:
        neutralizing any file-format-specific exploits contained within the attachment by applying at least one file-format-conversion operation to the attachment, wherein applying the file-format-conversion operation to the attachment comprises:
            identifying the attachment's current file format;
            converting the attachment into at least one file format that is different from the attachment's current file format;
            converting the attachment back to its original file format;
        completing the transmission of the electronic communication by providing the electronic communication to the specified recipient after neutralizing any file-format-specific exploits by converting the attachment into the file format that is different from the attachment's current file format and converting the attachment back to its original file format.

2. The method of claim 1, wherein identifying the attachment's current file format comprises determining that the attachment comprises a container file that contains at least one additional file in at least one file format.

3. The method of claim 2, wherein converting the attachment into at least one file format that is different from the attachment's current file format comprises:
    extracting at least one file from the container file;
    for at least one file extracted from the container file, neutralizing any file-format-specific exploits contained within the extracted file by applying at least one file-format-conversion operation to the extracted file, wherein applying the file-format-conversion operation to the extracted file comprises:
        identifying the extracted file's current file format;
        converting the extracted file into at least one file format that is different from the extracted file's current file format.

4. The method of claim 3, further comprising combining each converted extracted file into a new container file.

5. The method of claim 3, further comprising:
    removing any unrecognized file types from the container file;
    removing any active content from the container file.

6. The method of claim 2, wherein converting the attachment into at least one file format that is different from the attachment's current file format comprises:
    identifying the container file's current container file format;
    converting the container file into at least one container file format that is different from the container file's current container file format.

7. The method of claim 1, wherein applying the file-format-conversion operation to the attachment comprises applying a plurality of file-format-conversion operations to the attachment.

8. The method of claim 1, wherein the original file format comprises an image file format.

9. The method of claim 1, wherein applying the file-format-conversion operation to the attachment comprises applying the file-format-conversion operation to the attachment within a secure environment.

10. The method of claim 1, wherein neutralizing any file-format-specific exploits contained within the attachment further comprises constructing a sterile version of the attachment based on the attachment's contents by:
    identifying exploitable content contained within the attachment, wherein the exploitable content comprises file content that is vulnerable to at least one exploit;
    selectively omitting at least a portion of the exploitable content from the sterile version of the attachment.

11. The method of claim 1, wherein the computing device comprises at least one of:
    an endpoint computing device;
    a server-side computing device.

12. A computer-implemented method for neutralizing file-format-specific exploits included within files contained within electronic communications, at least a portion of the method being performed by a computing device comprising at least one processor, the method comprising:
    identifying an electronic communication;
    identifying at least one file contained within the electronic communication;
    neutralizing any file-format-specific exploits contained within the file by constructing a sterile version of the file in a file format that is identical to an original file format of the file based on the file's contents, wherein constructing the sterile version of the file comprises:
        identifying exploitable content contained within the file, wherein the exploitable content comprises file content that is vulnerable to at least one exploit;
        selectively omitting at least a portion of the exploitable content from the sterile version of the file.

13. The method of claim 12, wherein selectively omitting at least a portion of the exploitable content from the sterile version of the file comprises:
- retrieving a whitelist that identifies trustworthy content types;
- determining that at least one item of content contained within the file is of a content type that is not identified on the whitelist;
- omitting the item of content from the sterile version of the file.

14. The method of claim 12, wherein selectively omitting at least a portion of the exploitable content from the sterile version of the file comprises:
- retrieving a blacklist that identifies exploitable content types;
- determining that at least one item of content contained within the file is of a content type that is identified on the blacklist;
- omitting the item of content from the sterile version of the file.

15. The method of claim 12, wherein the original file format comprises an image file format.

16. The method of claim 12, wherein neutralizing any file-format-specific exploits contained within the file further comprises applying at least one file-format-conversion operation to at least one of:
- the file;
- at least one file extracted from the file;
- the sterile version of the file.

17. The method of claim 12, wherein constructing the sterile version of the file comprises constructing the sterile version of the file within a secure environment.

18. The method of claim 12, wherein the computing device comprises at least one of:
- an endpoint computing device;
- a server-side computing device.

19. A system for neutralizing file-format-specific exploits included within files contained within electronic communications, the system comprising:
- an identification module programmed to:
  - identify an electronic communication transmitted to a specified recipient at least in part by intercepting the electronic communication during transmission;
  - identify at least one file attached to the electronic communication as an attachment;
- a conversion module programmed to protect the specified recipient of the electronic communication by:
  - neutralizing any file-format-specific exploits contained within the attachment by applying at least one file-format-conversion operation to the attachment, wherein the conversion module applies the file-format-conversion operation to the attachment by:
    - identifying the attachment's current file format;
    - converting the attachment into at least one file format that is different from the attachment's current file format;
    - converting the attachment back to its original file format;
  - completing the transmission of the electronic communication by providing the electronic communication to the specified recipient after neutralizing any file-format-specific exploits by converting the attachment into the file format that is different from the attachment's current file format and converting the attachment back to its original file format;
- at least one processor configured to execute the identification module and the conversion module.

20. The system of claim 19, further comprising a sterilization module programmed to construct a sterile version of the attachment based on the attachment's contents by:
- identifying exploitable content contained within the attachment, wherein the exploitable content comprises file content that is vulnerable to at least one exploit;
- selectively omitting at least a portion of the exploitable content from the sterile version of the attachment.

* * * * *